Nov. 10, 1953 — F. HEUNEMAN — 2,658,541
HACKSAW FRAME WITH SPARE BLADE STORAGE CHAMBER
Filed Nov. 1, 1951
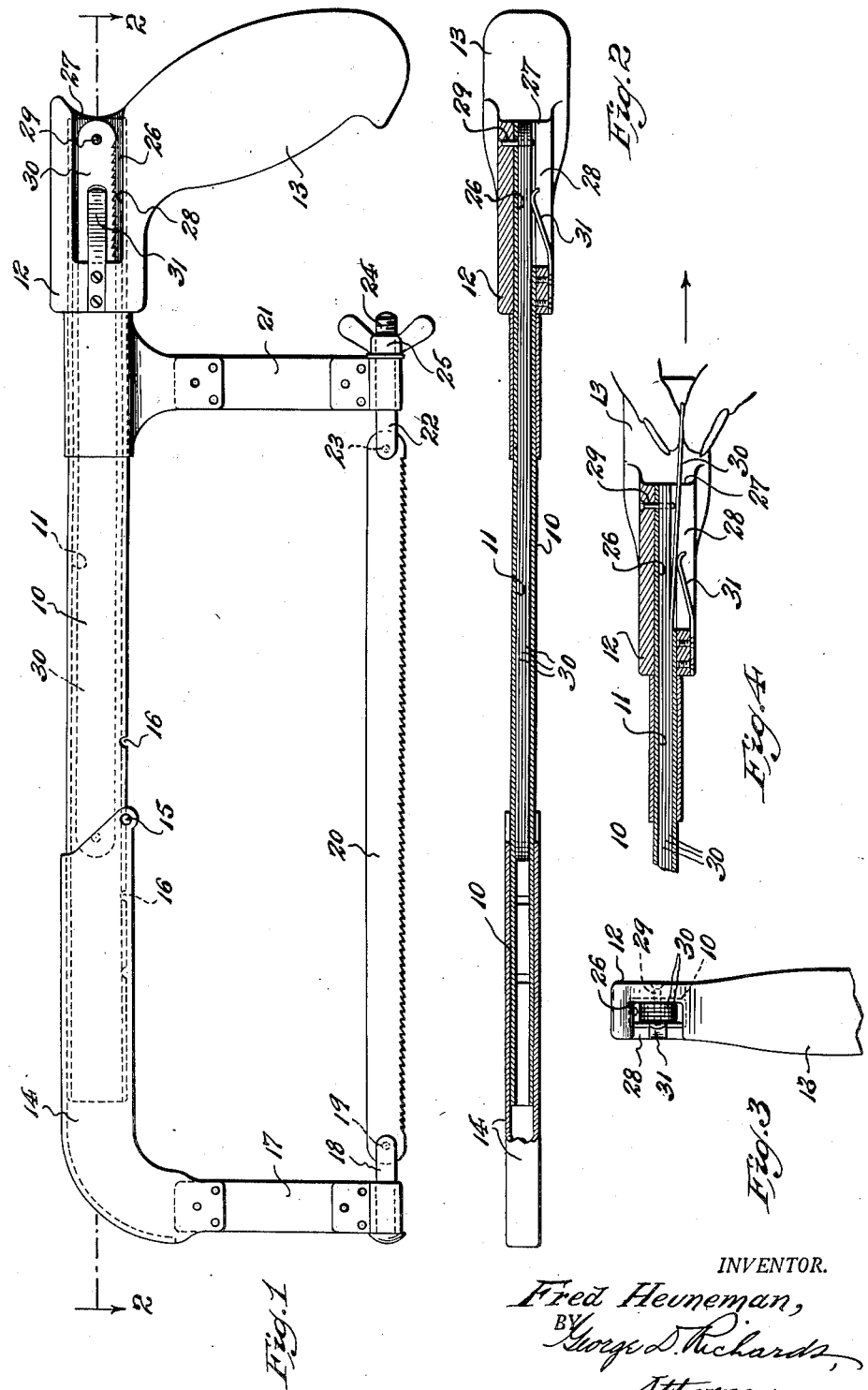
INVENTOR.
Fred Heuneman,
BY George D. Richards,
Attorney Patented Nov. 10, 1953

2,658,541

UNITED STATES PATENT OFFICE 2,658,541

HACKSAW FRAME WITH SPARE BLADE STORAGE CHAMBER

Fred Heuneman, Livingston, N. J., assignor to Armstrong-Blum Manufacturing Company, Chicago, Ill., a corporation of Illinois Application November 1, 1951, Serial No. 254,411

2 Claims. (Cl. 145—34)

This invention relates to improvements in hacksaw frames; and has reference, more particularly, to a hacksaw frame including a storage chamber for spare saw blades.

The invention has for an object to provide an improved construction of hacksaw frame designed to provide in connection therewith a storage chamber for holding a plurality of spare saw blades, said storage chamber being so arranged that individual saw blades can be quickly and easily withdrawn therefrom as use thereof is required, and this without necessity for disassembly of frame parts or other disturbance of the normal condition of the frame, or manipulation of removal elements.

The invention has for a further object to provide a spare saw blade storage chamber which extends into the horizontal back section of the hacksaw frame from the hand grip end of the latter; said chamber opening outwardly both endwise and laterally through the butt of the frame hand grip, so as to expose and give convenient access to end portions of the stored saw blades for withdrawing manipulation thereof, non-removable means being provided at said open end portion of the storage chamber for releasably retaining the stored saw blades against accidental displacement from said storage chamber.

Other objects of this invention, not at this time more particularly enumerated, will be understood from the following detailed description.

An illustrative embodiment of the invention is shown in the accompanying drawings, in which:

Fig. 1 is a side elevational view of a hacksaw frame provided with a storage chamber for holding spare saw blades according to this invention; Fig. 2 is a longitudinal horizontal sectional view, taken on line 2—2 in Fig. 1; and Fig. 3 is a fragmentary end elevational view, viewed from the right in Fig. 1.

Fig. 4 is a fragmentary horizontal sectional view, similar to that of Fig. 2, but showing manipulation of a spare saw blade for release and withdrawal thereof from the storage chamber.

Similar characters of reference are employed in the above described views, to indicate corresponding parts.

For the purpose of illustration, the spare saw blade storage chamber according to this invention is shown as embodied in a hacksaw frame of the adjustable type capable of selective accommodation, in use, of saw blades of different lengths; it will be understood, however, that the storage chamber may be equally well incorporated in a hacksaw frame of the non-adjustable type.

Referring to the drawings, an adjustable type hacksaw frame as therein shown comprises an endwise open tubular back bar section 10. This back bar section is formed in such suitable cross-sectional shape and area that its interior provides a longitudinally extending storage chamber 11 for the reception and storage of one or more spare saw blades. The outer end portion of said back bar section 10 extends through and is affixed to the butt portion 12 of the frame hand grip member 13. Telescopically engaged over the inner end portion of the back bar section 10 is an adjustable extension member 14 of inverted U-shape in cross-section, and having at its inner end, at the bottom thereof, a transverse coupling pin 15 adapted to be selectively engaged with transverse coupling notches 16 with which the bottom edge of the back bar section 10 is provided, whereby to interlock said extension member and back bar section together in selected frame length determining relation, in manner already well known to the art. Dependent from the outer end portion of the extension member 14 is the forward leg 17 of the frame, through the free extremity of which extends the well-known forward anchor element 18 having a laterally projecting coupling stud 19 to detachably secure the forward perforate end portion of an operative saw blade 20 assembled with the frame. Dependent from the back bar section 10, adjacent the inner end of the butt portion 12 of the hand grip member 13, is the rearward leg 21 of the frame, through the free extremity of which extends the likewise well-known longitudinally adjustable rearward anchor element 22 having a laterally projecting coupling stud 23 to detachably secure the rear perforate end portion of the operative saw blade 20 to the frame; said rearward anchor element 22 is provided with a rearwardly projecting screw-threaded shank 24 upon which is threaded a thumb nut 25, which is manipulatable to exert traction upon the anchor element 22, whereby to tautly stretch the saw blade 20 in its operative supported connection with the frame.

Formed in the butt portion 12 of the hand grip member 13 is a vestibule chamber 26 which is aligned with the storage chamber 11 provided by the interior of the frame back bar section 10, so as to communicate therewith. This vestibule chamber 26 is provided with a rear or outer end opening 27 from which extends a lateral opening or gateway 28 of substantial length to open outwardly from the vestibule chamber 26 through a side of said butt portion 12 of the hand grip member. The adjacent side wall of the back bar section 10 is cut away coincidently with said gateway 28. Fixed in the butt portion 12 of the hand grip member, to extend from the back wall of the vestibule chamber 26, which is provided by the opposite side of said butt portion, transversely across the interior of the vestibule chamber toward the gateway 28 thereof, is a keeper post 29. This keeper post is of a diameter to engage through perforate end portions of spare saw blades 30, when the latter are entered into and stored within the storage chamber 11. Such engagement of the stored blades 30 by the keeper post 29 retains the same against longitudinal movement and against accidental outward escape from the storage chamber 11.

Affixed to that side of the butt portion 12 of the hand grip member 13, through which the vestibule chamber gateway 28 opens, is a guarding leaf spring 31, the free end portion of which projects through said gateway 28 to yieldably bear against the spare blades 30 which are stored in the storage chamber 11, thus releasably retaining said blades against accidental disengagement from the keeper post 29 by which said blades are held against longitudinal movement and against accidental escape from the storage chamber 11.

To remove a contained saw blade 30 from the storage chamber 11, the rearward end of said saw blade, which lies within the vestibule chamber 26 so as to be accessible through the gateway 28, is engaged by the operator's fingers and outwardly flexed sufficiently to disengage its perforation from the keeper post 29, whereupon the saw blade can be withdrawn longitudinally rearward and out of the storage chamber. During this operation, the guarding leaf spring 31 readily yields to the flexed saw blade (see Fig. 4). After the withdrawn saw blade passes beyond the leaf spring 31, the latter will immediately move inwardly to engage any saw blades remaining in the storage chamber 11, whereby to hold the same against accidental disengagement from the keeper post 29. From the above it will be obvious that withdrawal of a stored saw blade can be easily and quickly accomplished merely by manipulation of the saw blade itself by the operator's fingers, and since no removable saw blade retaining elements are required, necessity for preparatory manipulation and opening of retaining elements is avoided.

Insertion of spare blades into the storage chamber 11 is equally easy, all that is necessary is to pass the entering end of a saw blade to be inserted beneath the free end of the guarding leaf spring 31, and thereupon push the saw blade into the storage chamber until the perforation of its rearward end is aligned with the keeper post 29, so that, when the saw blade is released, said leaf spring will exert inward thrust upon the rearward end thereof whereby to engage its perforation over the keeper post 29.

From the above it will also be understood that a very simple spare saw blade storage chamber structure is, by this invention, incorporated in a hacksaw frame, said structure being of such character that neither entering nor withdrawal of the spare saw blades requires any disassembly or disturbance of the structure or parts of the hacksaw frame.

Having now described my invention, I claim:

1. A hacksaw frame having a tubular back bar section the interior of which provides a storage chamber for spare blades having perforated end portions, a hand grip member having a butt portion affixed to said back bar section in longitudinal alignment therewith, said butt portion having an endwise open vestibule chamber of substantial length laterally open through one side wall thereof in communication with its rearward open end, said vestibule chamber communicating with and being longitudinally aligned with said storage chamber of the frame back bar, rear end portions of spare saw blades inserted within said storage chamber being exposed through the laterally open side of the vestibule chamber, a keeper post of a size to engage perforations in the blades affixed to the closed side wall of said butt portion inwardly adjacent to the open rear end of said vestibule chamber to extend laterally across the vestibule chamber toward the open side thereof, the perforate rearward end portions of the stored blades to be engaged over said keeper post so as to be normally held thereby against axial displacement from said storage chamber, an outermost blade being adapted to be disengaged from said keeper post by manually flexing its rearward end portion toward the laterally open side of the vestibule chamber and thereupon being subject to longitudinal withdrawal through the open rear end of the vestibule chamber, and yieldable means inwardly of said keeper post to releasably retain the stored blades in engagement with the latter.

2. A hacksaw frame having a tubular back bar section the interior of which provides a storage chamber for spare blades having perforated end portions, a hand grip member having a butt portion affixed to said back bar section in longitudinal alignment therewith, said butt portion having an endwise open vestibule chamber of substantial length laterally open through one side wall thereof in communication with its rearward open end, said vestibule chamber communicating with and being longitudinally aligned with said storage chamber of the frame back bar, rear end portions of spare saw blades inserted within said storage chamber being exposed through the laterally open side of the vestibule chamber, a keeper post of a size to engage perforations in the blades affixed to the closed side wall of said butt portion inwardly adjacent to the open rear end of said vestibule chamber to extend laterally across the vestibule chamber toward the open side thereof, the perforate rearward end portions of the stored blades to be engaged over said keeper post so as to be normally held thereby against axial displacement from said storage chamber, an outermost blade being adapted to be disengaged from said keeper post by manually flexing its rearward end portion toward the laterally open side of the vestibule chamber and thereupon being subject to longitudinal withdrawal through the open rear end of the vestibule chamber, and a leaf spring affixed to the inner end of said butt portion of the hand grip member to project through the laterally open side of the vestibule chamber so as to yieldably bear against the stored blades inwardly of said keeper post, whereby to releasably retain said blades in engagement with the latter.

FRED HEUNEMAN.

References Cited in the file of this patent

UNITED STATES PATENTS

| Number | Name | Date |
|---|---|---|
| 878,160 | Stebbins | Feb. 4, 1908 |
| 925,112 | Leland | June 15, 1909 |
| 2,332,545 | Acomb | Oct. 26, 1943 |
| 2,399,869 | Hough | May 7, 1946 |
| 2,581,332 | Testi | Jan. 1, 1952 |